(12) United States Patent
Angquist

(10) Patent No.: US 8,154,896 B2
(45) Date of Patent: Apr. 10, 2012

(54) STATCOM SYSTEM FOR PROVIDING REACTIVE AND/OR ACTIVE POWER TO A POWER NETWORK

(75) Inventor: Lennart Angquist, Enkoping (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 12/722,916

(22) Filed: Mar. 12, 2010

(65) Prior Publication Data

US 2010/0171472 A1   Jul. 8, 2010

Related U.S. Application Data

(63) Continuation of application No. PCT/EP2007/059717, filed on Sep. 14, 2007.

(51) Int. Cl.
*H02M 7/145* (2006.01)

(52) U.S. Cl. ............... 363/129; 323/210; 307/77

(58) Field of Classification Search ......... 307/77–78, 307/105, 5, 49, 54, 61, 63, 71; 363/205, 363/207–211, 129; 323/205, 207–211
See application file for complete search history.

(56) References Cited

U.S. PATENT DOCUMENTS

| | | | | |
|---|---|---|---|---|
| 3,921,059 A | * | 11/1975 | Birman et al. ............... | 323/266 |
| 5,329,222 A | | 7/1994 | Gyugyi et al. | |
| 5,751,138 A | * | 5/1998 | Venkata et al. ............... | 323/207 |
| 5,798,916 A | * | 8/1998 | Stacey et al. ............... | 363/135 |
| 5,942,880 A | * | 8/1999 | Akamatsu et al. ............ | 323/210 |
| 6,178,076 B1 | * | 1/2001 | Dahler et al. ............... | 361/90 |
| 6,535,404 B2 | * | 3/2003 | Ainsworth et al. ............ | 363/44 |
| 6,882,550 B1 | * | 4/2005 | Baumgart ................. | 363/40 |
| 2005/0093373 A1 | * | 5/2005 | Chapman et al. ............... | 307/80 |

FOREIGN PATENT DOCUMENTS

WO   9618937 A1   6/1996

OTHER PUBLICATIONS

International Preliminary Report on Patentability; PCT/EP2007/059717; Aug. 24, 2009; 10 pages.
International Search Report and Written Opinion of the International Searching Authority; PCT/EP2007/059717; May 29, 2008; 8 pages.
Nielsen J et al~ "Comparison of system topologies for dynamic voltage restorers" Conference Record of the 2001 IEEE Industry Applications Conference. 36th IAS Annual Meeting. Chicago, IL, Sep. 30 Oct. 4, 2001; [Conference Record of the IEEE Industry Applications Conference. IAS Annual Meeting], New York, NY : IEEE, US, vol. 4, Sep. 30, 2001, pp. 2397-2403, XP010562018.

(Continued)

*Primary Examiner* — Harry Behm
(74) *Attorney, Agent, or Firm* — St. Onge Steward Johnston & Reens LLC

(57) ABSTRACT

A static compensator system for providing reactive and/or active power to a power network. The system includes a static compensator, which has a DC capacitor $U_d$ and a voltage source converter. The static compensator is connected to an energy storage device. The system further includes a booster converter device connected in series with the energy storage device and in parallel with the DC capacitor $U_d$ of the static compensator. The booster converter device and the energy storage device are further connected in parallel with the voltage source converter of the static compensator.

25 Claims, 2 Drawing Sheets

OTHER PUBLICATIONS

Nasiri A et al: "Reduced parts three-phase series-parallel UPS system with active filter capabilities" Conference Record of the 2003 IEEE Industry Applications Conference. 38th. IAS Annual Meeting. Salt Lake City, UT, Oct. 12-16, 2003; [Conference Record of the IEEE Industry Applications Conference .. IAS Annual Meeting], New York, NY : IEEE, US, vol. 2, Oct. 12, 2003, pp. 963-969, XP010676132.

Sung-Min Woo et al: "The distribution STATCOM for reducing the effect of voltage sag and swell" IECON'Ol. Proceedings of the 27th. Annual Conference of the IEEE Industrial Electronics Society. Denver, CO, Nov. 29 Dec. 2, 2001; [Annual Conference of the IEEE Industrial Electronics SOnETY], New York, NY : IEEE, US, vol. 2,Nov. 29, 2001, pp. 1132-1137, XP010572937 ISBN: 978-0-7803-7108-8.

* cited by examiner

US 8,154,896 B2

STATCOM SYSTEM FOR PROVIDING REACTIVE AND/OR ACTIVE POWER TO A POWER NETWORK

CROSS-REFERENCE TO RELATED APPLICATIONS

The present application is a continuation of pending International patent application PCT/EP2007/059717 filed on Sep. 14, 2007 which designates the United States and the content of which is incorporated herein by reference.

FIELD OF THE INVENTION

The invention relates generally to the field of power transmission networks, and in particular to reactive power support to electric power transmission networks.

BACKGROUND OF THE INVENTION

An electrical power transmission network delivering electricity to consumers has to be able to handle voltage unbalances or instabilities, voltage sags, poor power factor, distortion or flicker occurring within the network. Reactive power control is one way to resolve such problems.

A STATCOM (STATic COMpensator) is an electrical device, which is based on voltage source converter (VSC) technology, and which can be used to provide reactive power support to the power transmission network. It is capable of producing or absorbing reactive power and can be adjusted by a high-speed control system.

FIG. 1 illustrates a basic STATCOM arrangement. In a basic configuration, the STATCOM 1 is made up of a DC voltage source 2, a DC/AC inverter 3 (voltage source converter, VSC) and transformer 4. Regulating the amplitude of the STATCOM output voltage controls the reactive power exchange of the STATCOM with a power network 5. If the amplitude of the output voltage exceeds the amplitude of the power network voltage, the reactive current flows through the transformer reactance from the STATCOM 1 to the power network 5 and the device generates reactive power. If the amplitude of the STATCOM output voltage is decreased to a level below that of the power network, then the current flows from the power network 5 to the STATCOM, which then absorbs reactive power. If the STATCOM output voltage is equal to the power network voltage, the reactive current is zero and the STATCOM does not generate nor absorb reactive power. The current drawn from the STATCOM is 90° shifted with respect to the power network voltage and it can be leading, i.e. generating reactive power, or it can be lagging, i.e. absorbing reactive power. Equivalently, leading (capacitive) or lagging (inductive) VARs [Volt-Ampere reactive] are produced.

The STATCOM comprises a main circuit, the voltage source converter VSC, that is designed to handle the injection or absorption of a certain amount of reactive power ("the rated power"). The main circuit may, for example, comprise insulated gate bipolar transistor (IGBT) devices, gate-turn-off thyristor (GTO) devices or integrated gate commutated thyristor (IGCT) devices.

There are situations in which it is advantageous to provide the STATCOM with an energy source on its DC side in order to provide some real power, also denoted active power, in addition to the reactive power generated to the network. That is, it is sometimes advantageous to be able to control not only the reactive power, but also to inject or absorb real power. For example, the real power can be utilized either as a source of reserve power when an energy deficit suddenly occurs within the network, or as a control power for managing transients and electromechanical oscillations in the network.

FIG. 2 illustrates a STATCOM having an energy source 6 ($U_{es}$) connected to its DC side. The energy source 6 may be materialized as an energy storage device that can temporarily supply energy that has previously been stored or as an energy supply that comprises some kind of conversion of non-electrical energy into electrical power. The energy source 6 may for example comprise conventional DC capacitors, super capacitors, electrochemical batteries, fuel cells or photovoltaic modules.

The energy sources 6 are adapted to a respective typical discharge cycle time, acting for seconds (conventional capacitors), minutes (super capacitors) or up to 30 minutes (batteries) or even continuously (fuel-cells or photovoltaic modules) depending on the type of storage element and loading conditions. Irrespective of type of energy source, in the following energy storage device 6, that is connected to the STATCOM DC link, they have in common that their DC voltage changes during the charge/discharge cycle. However, the DC voltage on the STATCOM must exceed a certain minimum level in order to make the STATCOM capable of providing the reactive power that it is rated for. In particular, the STATCOM has to be able to provide its rated reactive power even when the energy source is discharged or reaches its lowest accepted charge level.

As the DC voltage of the energy source 6 is connected directly to the DC-bus of the STATCOM, the latter must be designed to be able to operate with a varying DC voltage. The rated DC voltage, $U_{DC}$, for the STATCOM cannot be higher than the lowest operating voltage of the energy source, i.e. $U_{DC} \leq U_{es,\,min} = U_{es}$(discharged). The STATCOM must be able to operate with all DC voltage levels up to the highest DC voltage of the energy source, i.e. up to $U_{es,\,max} = U_{es}$(fully charged).

The main circuit of the STATCOM has to be designed to handle the maximum DC voltage level $U_{es,\,max}$(fully charged) in order to cope with the variation of the DC voltage in the energy storage device 6. This is very costly, due to the expensive components that have to be used for such over-dimensioning. Typically, the DC voltage variation of the energy storage device 6 is 20-100% of the rated DC voltage for the STATCOM. The STATCOM is rated for handling a certain reactive power, e.g. 100 MVAr, and if this rated reactive power is high compared to the rated active power of the energy storage device 6, i.e. compared to the real power component, the costs caused by the varying DC voltage level are high.

FIG. 3 illustrates a prior art solution for handling the varying DC voltage of an energy storage device. In particular, a DC-to-DC converter 7 may be utilized for converting the voltage to a desired voltage. However, as DC/DC converters are quite complicated and costly, specifically as the whole active power has to pass through the DC/DC converter and because the voltage level that is suitable for the VSC may be quite high, the costs are increased substantially.

The costs for over-dimensioning the DC handling capability of a STATCOM in order for the STATCOM to be able to handle the varying DC voltage of a connected energy storage is thus very costly.

SUMMARY OF THE INVENTION

It is an object of the invention to provide a STACOM system for providing reactive and/or active power to a power network, whereby the above-described problems are overcome or at least alleviated. In particular, it is an object of the invention to provide an improved way of interfacing an energy storage device having varying DC voltage with a STATCOM operating at constant DC voltage.

It is another object of the invention to provide an improved way of providing a constant STATCOM DC voltage irrespective of the operating state of an energy storage device and in particular irrespective of charging level of the energy storage device.

These objects, among others, are achieved by a static compensator system for providing reactive and/or active power to a power network as claimed in the independent claim.

In accordance with the invention a static compensator system for providing reactive and/or active power to a power network is provided. The system comprises a static compensator (STATCOM), which in turn comprises a DC capacitor and a voltage source converter. The DC capacitor and the voltage source converter of the STATCOM are connected in parallel. The STATCOM is connected to a separate energy storage device providing DC voltage. The system is characterized by a booster converter device, which is connected in series with the energy storage device and connected in parallel with the DC capacitor of the STATCOM. The booster converter device and the energy storage device are further connected in parallel with the voltage source converter of the STATCOM. By means of the invention great cost savings can be made; the use of less expensive components is for example enabled as well as the use of more robust components. There is no need to over-dimension the STATCOM in order to handle the varying voltage levels of an external energy storage device. Further, lower losses are achieved and lower power handling.

In accordance with an embodiment of the invention, the booster converter circuit comprises a current source converter. It can for example be a thyristor converter. Components readily available on the market may thus be used. Further, the use of conventional line commutated thyristors is very cost efficient.

In accordance with another embodiment of the invention, the booster converter device is arranged to handle a voltage difference between the energy storage device and the DC source of the STATCOM. In particular, the booster converter device may be arranged to charge the energy storage device as well as providing voltage to the DC source of the STATCOM. The booster converter device can thus comprise means for producing unidirectional voltage or comprise means for producing bidirectional voltage. The system can thus easily be adapted to suit the particular needs of the user or to suit a particular power system.

In accordance with still another embodiment of the invention, the booster converter device is arranged to be energized via a transformer from AC terminals of the STATCOM. The transformer may be connected to the AC terminals of the STATCOM on the primary side or the secondary side of the STATCOM transformer.

Alternatively, the booster converter device is arranged to be fed by means of a separate AC feed. Again, the system can thereby be adapted to suit the particular needs of a user or adapted for use in a particular system.

In accordance with yet another embodiment of the invention, the energy storage device comprises a DC capacitor, a super capacitor, an electrochemical battery, a fuel cell or photovoltaric modules. Any suitable energy storage device can be used in the system of the present invention.

In yet another embodiment of the invention, the booster converter device comprises means for producing reactive power to the network. The means for producing reactive power may for example comprise turn-off semiconductor devices, such as gate turn-off thyristors. An additional feature is thus provided to the system.

Further embodiments of the invention are defined in the dependent claims. Further embodiments and advantages thereof will become clear upon reading the following detailed description together with the drawings.

DETAILED DESCRIPTION OF THE INVENTION

Figure 1:
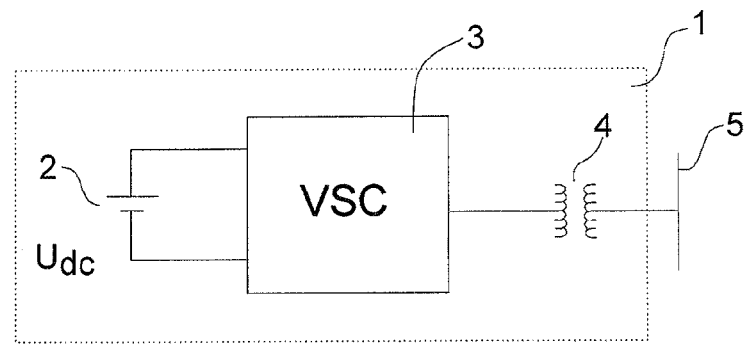
FIG. 1 illustrates a basic STACOM configuration.
Figure 2:
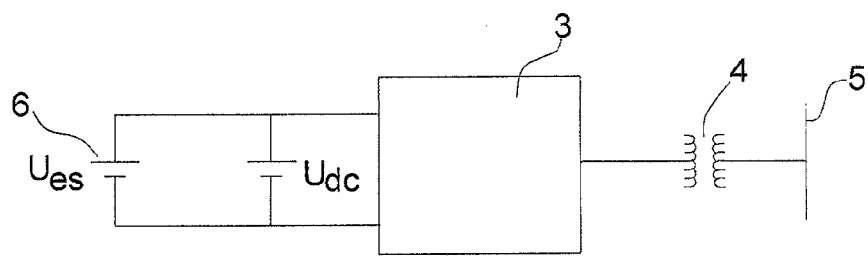
FIG. 2 illustrates a prior art STATCOM connected to an energy storage device.
Figure 3:
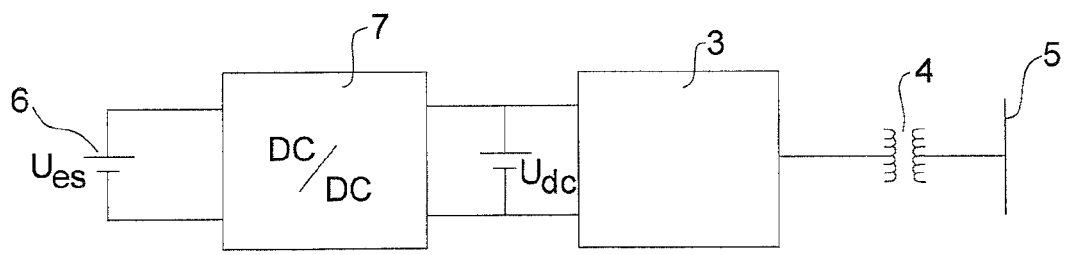
FIG. 3 illustrates a prior art solution for handling varying voltages of an energy source.

FIGS. 1-3 have already been discussed in connection with prior art and will not be explained further.

Figure 4:
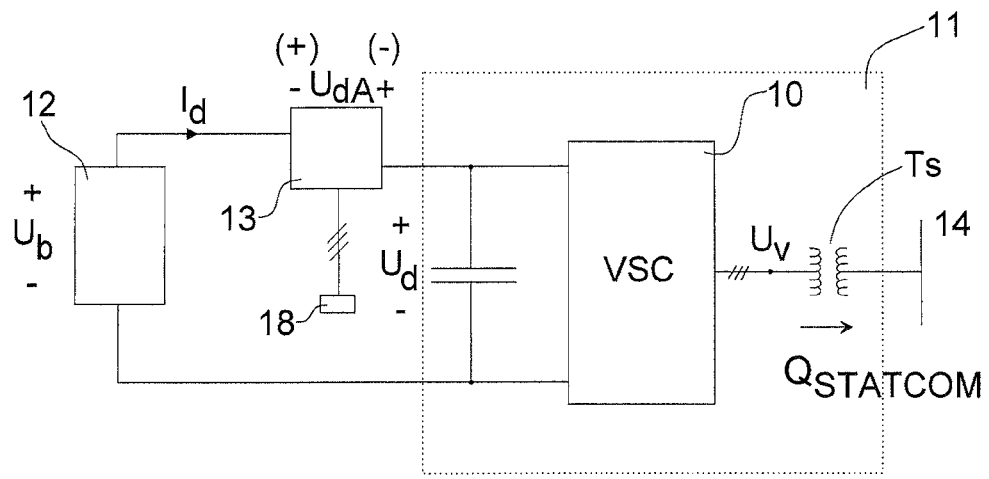
FIGS. 4 and 5 illustrate embodiments of the present invention.

FIG. 4 illustrates an embodiment of the present invention. In particular, in FIG. 4 a STATCOM (static synchronous compensator, in the following simply STATCOM or static compensator) 11 having a desired constant DC voltage level $U_d$ is illustrated connected to a power network 14. The STATCOM 11 is of a conventional type and comprises a DC link, $U_d$, for example a DC capacitor bank (in the following DC capacitor), a DC/AC converter and a transformer $T_s$. The DC/AC converter comprises a voltage source converter (VSC) 10, which converts the DC voltage into a three-phase set of output voltages or into a single-phase voltage to the power network 14. The DC capacitor is connected in parallel with the VSC 10. The main circuit of the STATCOM 11 is the VSC 10, which thus is designed to handle the injection or absorption of reactive power. The main circuit may, for example, comprise insulated gate bipolar transistor (IGBT) devices, gate-turn-off thyristor (GTO) devices or integrated gate commutated thyristor (IGCT) devices. The average value of the DC voltage $U_d$ is regulated by a VSC control system and the DC capacitor is arranged to maintain a constant DC voltage in order to allow the operation of the voltage-source converter 10.

In order to provide real power besides the reactive power, an energy storage device 12 of a voltage $U_b$ is connected in parallel with the STATCOM 11, and in particular connected in parallel with the DC capacitor. For convenience, an electrochemical battery is used sometimes in the following description as an example of the energy storage device 12. However, it is noted that any other type of energy storage element can be used in connection with the present invention, such as the earlier mentioned examples: conventional DC capacitors, super capacitors, electrochemical batteries, fuel cells or photovoltaric modules. The energy storage device may thus, as also mentioned before, be materialized as an energy storage device that can temporarily supply energy that has previously been stored or as an energy supply that comprises some kind of conversion of non-electrical energy into electrical power.

The STATCOM 11 should preferably be operated at an approximately constant DC voltage $U_d$ and in accordance with the invention, the problem of interfacing the STATCOM 11 with the energy storage device 12 having a varying voltage is solved by introducing a booster converter device 13. In accordance with the invention, the varying DC level of the energy storage device 12 is handled by the booster converter device 13. The booster converter device 13 provides a varying DC voltage that is connected in series with the energy storage device 12 and in parallel with the STATCOMs DC side.

Figure 5:
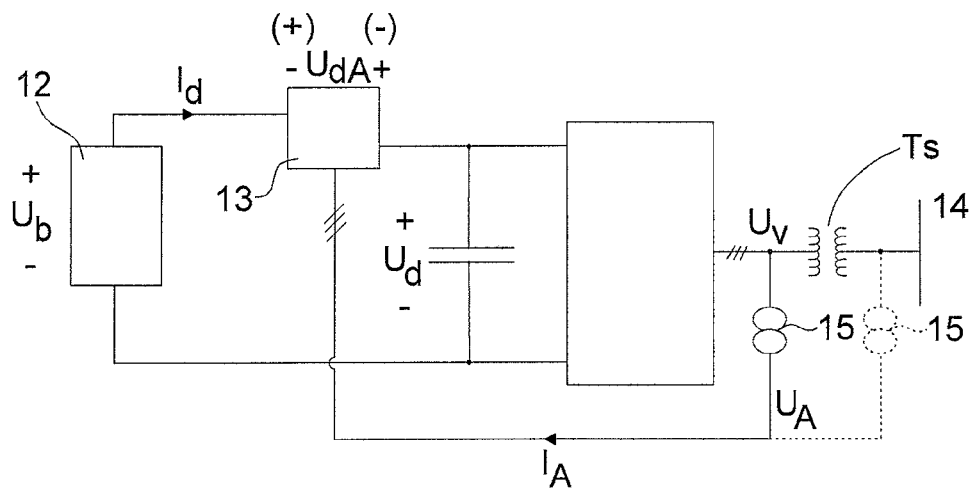

As illustrated in FIGS. 4 and 5, the booster converter device 13 is connected in series with the energy storage device 12 and in parallel with the STATCOMs 11 DC side, i.e. the series connected energy storage device 12 and booster converter device 13 are connected in parallel with the DC capacitor $U_d$ of the STATCOM 11. As mentioned, the STATCOMs 11 DC side may for example be a DC capacitor bank of the STATCOM 11. The main idea of the present invention is thus to introduce the booster converter device 13 and let it handle the voltage variation of the energy storage device 12. The booster converter device 13 only needs to handle the difference between the nominal voltage $U_d$ and the voltage of the energy storage device 12. This is in contrast to the prior art solution mentioned earlier, wherein the DC/DC converter 7 should be able to handle the maximum voltage. The booster converter device 13 adds voltage when needed. The booster converter device 13 is in an embodiment a current source converter, which charges the DC capacitor bank.

As illustrated in FIG. 5, the booster converter device 13 is preferably energized via a transformer 15 connected to the STATCOM. The transformer 15 is then connected to the AC terminals of the STATCOM 11. The booster converter device 13 is connected to the transformer 15, which in turn is connected to AC terminals of the static compensator 11, either on the primary side of the STATCOM transformer $T_s$ as shown in the figure, or on the secondary side of the STATCOM transformer $T_s$, as described briefly next. Thereby the booster converter device 13 is energized from AC terminals of the static compensator 11.

The transformer 15 may alternatively be connected to the secondary-side of the STATCOM transformer $T_s$, as is indicated by the dashed line in FIG. 5. This could be advantageous if the STATCOM transformer $T_s$ is part of a filter arrangement.

Further, it is conceivable to feed the booster converter device 13 by means of a separate AC feed, as illustrated schematically at 18 in FIG. 4.

Figure 6:
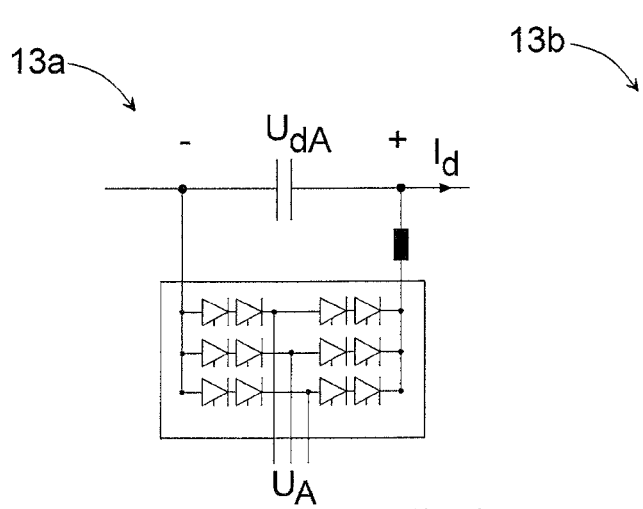
FIG. 6 illustrates an embodiment of a booster converter device for use in the present invention.

FIG. 6 illustrates a first exemplary implementation of the booster converter device 13. The booster converter device 13a may be a thyristor converter implemented for unidirectional current flow, as shown in FIG. 6. This implementation is suitable if the energy storage device 12 is charged electrically by some separate, not illustrated arrangement. For example, the energy storage device 12 may be charged by a separate rectifier fed from a local generator, such as a diesel backup. Another situation in which this implementation of the booster converter device 13a is suitable is when the primary energy is non-electric, for example fuel cells or solar energy. As the booster converter device 13a in this embodiment is unidirectional, it cannot charge the energy storage device 12.

Briefly, a thyristor converter comprises a sixpulse bridge (or a single-phase bridge) of thyristor valves. In each arm of the bridge a number of thyristor devices are stacked to form a series string that has sufficient voltage handling capability for the application. The voltage control function relies on controlled firing of the valves relative the AC side voltage, as is known to a person skilled in the art. The commutation of the valves relies on the impressed AC voltage and does not require any action controls. The thysistor devices are very robust and reliable devices. They provide a high voltage handling capability at minimum cost and have low losses.

Figure 7:
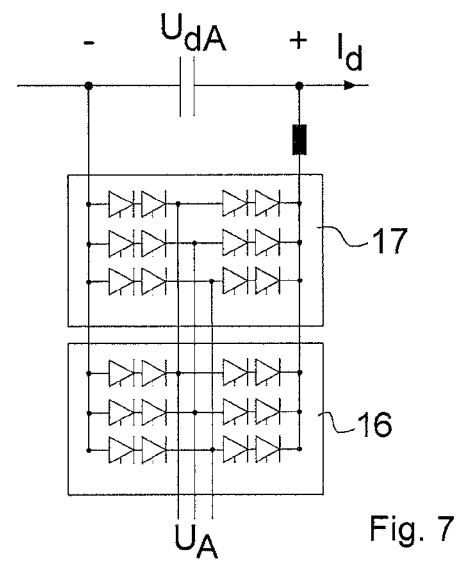
FIG. 7 illustrates another embodiment of a booster converter device for use in the present invention.

FIG. 7 illustrates a second exemplary implementation of the booster converter device 13b. The booster converter device 13b is again a thyristor converter, but here implemented for bidirectional current flow. Such bidirectional current flow is indicated in FIGS. 4 and 5 by plus- and minus signs above the booster converter device 13. The booster converter device 13b is used for charging the energy storage device 12 as well as for providing the required real power output. This is accomplished by the lower circuit 16 and upper circuit 17, respectively. The energy can thus flow from the energy storage device 12 to the network 14 or in the opposite direction, in contrast to the embodiment of FIG. 6.

It is to be noted that various approaches may be utilized to smooth the DC side current in the booster converter device 13. Inductances may be provided either on the DC side or on the AC side.

The booster converter device 13 may be equipped with turnoff semiconductor devices having reverse blocking capability, e.g. utilizing components such as GTOs (gate turn-off thyristor) or IGBT (insulated gate bipolar transistor) and diodes. In such case the booster converter device 13 may also produce reactive power to the network 14.

In both embodiments of the booster converter device 13, a DC capacitor is most likely required and a smoothing reactor is preferably connected between the thyristor converter 13a, 13b and the DC capacitor for reducing ripple. In order to highlight the advantages of the present invention a simple rating example will be given in the following.

Assume that the STATCOM 11 is designed to deliver (rated for) 100 MVAR at 1500 Arms. The AC line-line voltage is then $U_v$=38.5 kVrms (see FIGS. 4 and 5). The corresponding minimum DC voltage of the STATCOM is approximately $U_d$=75 kV. Further, assume that the STATCOM 11 should deliver 10 MW real power in addition to the 100 MVAR reactive power and that the DC voltage of the energy storage device 12 varies 50%. The voltage of the energy storage device 12 thus varies between the required minimum 75 kV and up to fully charged 112.5 kV.

If the energy storage device 12 were to be connected directly to the DC bus of the STATCOM 11, i.e. in accordance with prior art, then the maximum DC voltage to be handled by the STATCOM 11 becomes $U_{dmax}$=1.50*75 kV=112.5 kV. The rating of the STATCOM main circuit is then 150 MVAR, i.e. it has to be upgraded by 50 MVA due to the variation in the DC voltage of the energy storage device 12.

However, if the energy storage device 12 is connected in accordance with the invention, then there are two cases depending on implementation of the booster converter device 13:

1) Booster Converter Device Producing Unidirectional Voltage:

When the maximum DC voltage of the energy storage device 12 is selected to be $U_{bmax}=U_{dn}$=75 kV, wherein $U_{dn}$ is the required nominal DC voltage for the STATCOM 11, then the voltage of the energy storage device will vary between 50 kV and 75 kV (i.e. 50 kV+50%). A variable series voltage $0 \leq U_{dA} \leq 25$ kV is then needed in series with the energy storage device 12. The maximum current occurs at the minimum DC voltage of the energy storage device 12 and is $I_{dmax}$=10 MW/50 kV=0.20 kA. The rating of the booster converter device 13 then becomes $S_{boost}=U_{dAmax}*I_{dmax}$=25 kV*0.2 kA=5.0 MVA. The booster converter device 13 rating is thus only 10% of the converter rating upgrade necessary in the case when the energy storage device is connected in accordance with the prior art, i.e. connected directly to the DC side of the STATCOM. That is, while the prior art solution requires the STATCOM to be upgraded from 100 MVAR to 150 MVAR, i.e. upgraded by 50 MVAR, due to the variation in the DC voltage of the energy storage device, the present invention requires only 10% of that upgrade, i.e. only 5 MVAR. This illustrates that very large cost savings can be provided by means of the present invention.

2) Booster Converter Device Producing Bidirectional Voltage:

Current source converters can produce a DC side voltage with any polarity. The maximum voltage in inverting mode ($\alpha \approx 90°$-$180°$) is somewhat lower than the voltage produced in rectifying mode ($\alpha \approx 0°$-$90°$). Assume that the ratio between the voltage in rectifier mode and inverter mode is 1:0.8. The energy storage device voltage may then vary in the range $58.7 \leq U_b \leq 88.0$ kV corresponding to a variable series voltage and $-13.0 \leq U_{dA} \leq +16.3$ kV. Maximum DC current occurs at minimum energy storage device voltage and thus becomes $I_{dmax}$=10 MW/58.7 kV=0.170 kA. The rating of the booster converter device 13 then becomes $S_{boost} = U_{dAmax} * I_{dmax} = 16.3$ kV*0.17 kA=2.8 MVA. That is, an even larger cost saving compared to the prior art solution can be obtained.

The above calculations clearly show advantages of the present invention compared to the prior art. The costs for over-dimensioning the rated DC voltage in the STATCOM as is done in the prior art are eliminated by the present invention. Further, the above calculations illustrate that the rating of the booster converter device 13 is only a portion of the rating of the STATCOM.

In both embodiments of the booster converter device 13, a DC capacitor is probably required and a smoothing reactor is connected between the booster converter device 13 and the DC capacitor. Assuming idealized conditions, the following AC voltage and current is required:

For a Unidirectional Boost Voltage the Following Applies:

$$U_A = \frac{U_{dAmax}}{\frac{3\sqrt{2}}{\pi}} = 25/1,35 = 18,5 \text{ kVrms}$$

The transformer voltage ratio therefore becomes 18.5/38.5=0.48:1. The AC side current is $$I_{Amax} = \sqrt{\frac{2}{3}} I_{dAmax} = 0,816 \times 0,20 = 0,163 \text{ kArms}$$

The transformer voltage ratio therefore becomes 12.1/38.5=0.31:1. The AC side current is For a Bidirectional Boost Voltage the Following Applies:

$$U_A = \frac{U_{dAmax}}{\frac{3\sqrt{2}}{\pi}} = 16,3/1,35 = 12,1 \text{ kVrms}$$

The transformer voltage ratio therefore becomes 12.1/38.5=0.31:1. The AC side current is $$I_{Amax} = \sqrt{\frac{2}{3}} I_{dAmax} = 0,816 \times 0,17 = 0,138 \text{ kArms}$$

Further optimization of the voltage matching may be done, with respect to the booster converter device 13 rating.

It is under most circumstances unlikely that the booster converter device 13 will operate in inverter mode, even if the embodiment shown in FIG. 7 is used. That is, even if the bidirectional voltage approach is used. The reason for this is that the highest battery voltage occurs when the battery is being charged. Part of the active charging power is then supplied through the booster converter device bridge having the negative current direction (reference is made to FIGS. 6 and 7 for current directions) operating in rectifying mode. Similarly the lowest battery voltage will appear when the battery is being discharged and then the booster converter device bridge having positive current direction is operating in rectifying mode.

It is further noted that the real power will often only be provided during a fairly short period of time, say 5-30 minutes. This period of time is certainly shorter than the thermal time constant in the transformer and the smoothing inductor and it may be possible to rate these components for a lower continuous rating. That is, the transformer and smoothing inductor will not be over-heated during this short time period, enabling a lower rating. The same lowered rating may be possible for the valve as well as for the capacitor bank. Additional cost savings can thus be achieved.

What is claimed is:

1. A static compensator system for providing reactive and active power to a power network, said system comprising a static compensator comprising a DC capacitor and a voltage source converter connected in parallel, said static compensator being connected to an energy storage device adapted to provide active power to the power network, wherein a booster converter device is connected in series with said energy storage device, wherein said booster converter device and said energy storage device are connected in parallel with said DC capacitor of said static compensator, wherein said booster converter device and said energy storage device are connected in parallel with said voltage source converter of said static compensator, and wherein said booster converter device is arranged to be fed by means of a separate AC feed.

2. The static compensator system as claimed in claim 1, wherein said booster converter device comprises a current source converter.

3. The static compensator system as claimed in claim 1, wherein said booster converter device is arranged to handle a voltage difference between said energy storage device and said DC capacitor.

4. The static compensator system as claimed in claim 1, wherein said booster converter device is arranged to charge said energy storage device.

5. The static compensator system as claimed in claim 1, wherein said booster converter device comprises means for producing unidirectional voltage.

6. The static compensator system as claimed in claim 1, wherein said booster converter device comprises means for producing bidirectional voltage.

7. The static compensator system as claimed in claim 1, wherein said DC capacitor of said static compensator is arranged to maintain a constant DC voltage to said voltage source converter of said static compensator.

8. The static compensator system as claimed in claim 1, wherein said energy storage device comprises a DC capacitor, a super capacitor, an electrochemical battery, a fuel cell or photovoltaric modules.

9. The static compensator system as claimed in claim 1, wherein said booster converter device comprises means for producing reactive power to said network.

10. The static compensator system as claimed in claim 9, wherein said means for producing reactive power comprises turn-off semiconductor devices.

11. The static compensator system as claimed in claim 1, wherein said energy storage device has a voltage that varies between 75 kV and 112.5 kV.

12. The static compensator system as claimed in claim 1, wherein said booster converter device comprises thyristor valves.

13. A static compensator system for providing reactive and active power to a power network, said system comprising a static compensator comprising a DC capacitor and a voltage source converter connected in parallel, said static compensator being connected to an energy storage device adapted to provide active power to the power network, wherein a booster converter device is connected in series with said energy storage device, wherein said booster converter device and said energy storage device are connected in parallel with said DC capacitor of said static compensator, wherein said booster converter device and said energy storage device are connected in parallel with said voltage source converter of said static compensator, wherein said booster converter device is connected to a transformer in turn connected to AC terminals of said static compensator, whereby said booster converter device is arranged to be energized from AC terminals of said static compensator.

14. The static compensator system as claimed in claim 13, wherein said static compensator further comprises a transformer, and wherein said transformer connected to said booster converter device is connected to the AC terminals of said static compensator via said transformer of said static compensator.

15. The static compensator system as claimed in claim 13, wherein said booster converter device comprises a current source converter.

16. The static compensator system as claimed in claim 13, wherein said booster converter device is arranged to handle a voltage difference between said energy storage device and said DC capacitor.

17. The static compensator system as claimed in claim 13, wherein said booster converter device is arranged to charge said energy storage device.

18. The static compensator system as claimed in claim 13, wherein said booster converter device comprises means for producing unidirectional voltage.

19. The static compensator system as claimed in claim 13, wherein said booster converter device comprises means for producing bidirectional voltage.

20. The static compensator system as claimed in claim 13, wherein said DC capacitor of said static compensator is arranged to maintain a constant DC voltage to said voltage source converter of said static compensator.

21. The static compensator system as claimed in claim 13, wherein said energy storage device comprises a DC capacitor, a super capacitor, an electrochemical battery, a fuel cell or photovoltaric modules.

22. The static compensator system as claimed in claim 13, wherein said booster converter device comprises means for producing reactive power to said network.

23. The static compensator system as claimed in claim 22, wherein said means for producing reactive power comprises turn-off semiconductor devices.

24. The static compensator system as claimed in claim 13, wherein said energy storage device has a voltage that varies between 75 kV and 112.5 kV.

25. The static compensator system as claimed in claim 13, wherein said booster converter device comprises thyristor valves.

* * * * *